(12) United States Patent
Chambers, II et al.

(10) Patent No.: US 7,904,583 B2
(45) Date of Patent: Mar. 8, 2011

(54) METHODS AND SYSTEMS FOR MANAGING AND CONTROLLING AN AUTOMATION CONTROL MODULE SYSTEM

(75) Inventors: Robert Baxter Chambers, II, Barboursville, VA (US); Ferrell Mercer, Madison, VA (US)

(73) Assignee: GE Fanuc Automation North America, Inc., Charlottesville, VA (US)

( * ) Notice: Subject to any disclaimer, the term of this patent is extended or adjusted under 35 U.S.C. 154(b) by 1223 days.

(21) Appl. No.: 10/617,551

(22) Filed: Jul. 11, 2003

(65) Prior Publication Data
US 2005/0021676 A1 Jan. 27, 2005

(51) Int. Cl.
G06F 15/16 (2006.01)

(52) U.S. Cl. ......... 709/236; 709/217; 709/220; 709/223; 709/250

(58) Field of Classification Search ........... 709/217, 709/218, 219, 220, 223, 225, 230, 236, 250
See application file for complete search history.

(56) References Cited

U.S. PATENT DOCUMENTS

| | | | |
|---|---|---|---|
| 5,038,318 A | 8/1991 | Roseman | |
| 5,307,463 A | 4/1994 | Hyatt et al. | |
| 5,797,037 A | 8/1998 | Ecclesine | |
| 5,801,942 A | 9/1998 | Nixon et al. | |
| 5,805,442 A | 9/1998 | Crater et al. | |
| 5,887,165 A | 3/1999 | Martel et al. | |
| 5,978,578 A | 11/1999 | Azarya et al. | |
| 6,038,486 A | 3/2000 | Saitoh et al. | |
| 6,061,603 A | 5/2000 | Papadopoulos et al. | |
| 6,151,625 A | 11/2000 | Swales et al. | |
| 6,169,928 B1 | 1/2001 | Olson et al. | |
| 6,263,487 B1 | 7/2001 | Stripf et al. | |
| 6,282,454 B1 | 8/2001 | Papadopoulos et al. | |
| 6,353,853 B1 * | 3/2002 | Gravlin | 709/219 |
| 6,381,502 B1 * | 4/2002 | Rudder et al. | 700/2 |
| 6,405,099 B1 * | 6/2002 | Nagai et al. | 700/159 |
| 6,510,350 B1 * | 1/2003 | Steen et al. | 700/9 |
| 6,640,140 B1 * | 10/2003 | Lindner et al. | 700/18 |
| 6,732,191 B1 * | 5/2004 | Baker et al. | 710/1 |
| 6,853,867 B1 * | 2/2005 | Klindt et al. | 700/83 |
| 6,915,330 B2 * | 7/2005 | Hardy et al. | 709/203 |
| 7,159,007 B2 * | 1/2007 | Stawikowski | 709/202 |
| 7,216,007 B2 * | 5/2007 | Johnson | 700/83 |
| 7,441,114 B2 * | 10/2008 | Collier et al. | 713/152 |
| 7,536,475 B2 * | 5/2009 | Collier et al. | 709/236 |

* cited by examiner

Primary Examiner — Rupal D Dharia
Assistant Examiner — Van Kim T Nguyen
(74) Attorney, Agent, or Firm — Armstrong Teasdale LLP

(57) ABSTRACT

A web-enabled automation control module (ACM) system includes at least one network module configured to receive a request for a file from the network, a web server and database module located outside the network module and including a database configured to store the file, and an ACM central processing unit (CPU) configured to send ACM data to the web server and database module to embed ACM data in the file.

21 Claims, 11 Drawing Sheets

```
<html>

<head>
<title>CPU374 PLC Mode </title>
</head>
<body>
<script>
<1-- hide me
var PLC_mode = "<1-- gef:plcMode -->"

// stop hiding -->
</script>
<table border="1" >
    <tr>
       <td >CPU374 PLC Mode Display</td>
     </tr>
    <tr>
       <td >PLC Mode</td>
<script>
<1-- hide me
    document.write("<td>");
    document.write(PLC_mode);
    document.write("</td>");

// stop hiding -->
</script>
   </tr></table></body></html>
```

FIG. 10

US 7,904,583 B2

METHODS AND SYSTEMS FOR MANAGING AND CONTROLLING AN AUTOMATION CONTROL MODULE SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to automation control module (ACM) systems and more particularly to managing and controlling ACM systems.

Known ACM systems access ACM data using an input/output (I/O) module connected to a backplane on the ACM. The I/O module increases the cost of the system and uses additional space in the ACM system cabinet. In addition, if the backplane includes a plurality of modules, the I/O module may respond more slowly.

Known web-enabled ACM systems also provide pre-defined web pages that contain ACM data in a format determined by the manufacturer. Pre-defined web pages are inflexible and may be intolerable to many users. Furthermore, known ACM systems that include a web server use the ACM's central processing unit (CPU) to run the web server and the transmission control protocol (TCP)/internet protocol (IP) stack, thereby degrading performance of the CPU.

BRIEF DESCRIPTION OF THE INVENTION

In one aspect, a web-enabled automation control module (ACM) system includes at least one network module configured to receive a request for a file from the network, a web server and database module located outside the network module and including a database configured to store the file, and an ACM central processing unit (CPU) configured to send ACM data to the web server and database module to embed ACM data in the file.

In another aspect, a method for managing and controlling an ACM system includes sending a request for a file from a network to at least one network module, storing the file in a database of a web server and database module, and sending ACM data from an ACM CPU to the web server and database module to embed the ACM data in the file.

In yet another aspect, a method for managing and controlling an ACM system is provided. The system includes at least one network module electrically connected to a network and a web server and database module electrically connected to the network module and located outside the network module. The method includes receiving a request for a file from the network, storing the file in a database of the web server and database module, and transmitting ACM data to be embedded in the file from an ACM CPU.

BRIEF DESCRIPTION OF THE DRAWINGS

FIG. 10 is an example of an HTML for a web page for retrieving a mode of the ACM of the present invention using HTML, Javascript, and ACM tag functions.

DETAILED DESCRIPTION OF THE INVENTION

Set forth below are descriptions of embodiments of methods and systems for control and management of an automation control module (ACM). The methods and systems facilitate viewing and controlling ACM data through standard networks, protocols, and browsers, developing and downloading user-defined web pages that include ACM data, and controlling the access level to the ACM and user-defined web pages.

The methods and systems are not limited to the specific embodiments described herein. In addition, components of each system and steps of each method can be practiced independent and separate from other components and steps described herein. Each component and step can also be used in combination with other components and steps.

As used herein, the term ACM refers to any device used to control the automation of an activity, including but not limited to PLCs, computer numeric controls (CNCs), motion control products, home automation products, and commercial automation products, for example controls for automated teller machines or car wash systems. As used herein, ACM data includes different types of data within an ACM system 10 that control operation of ACM system 10. ACM data includes, but is not limited to, user logic programs, user program memory, ACM status and statistics, ACM faults, setting ACM operating states, setting privilege levels, and any other useful ACM information.

Figure 1:
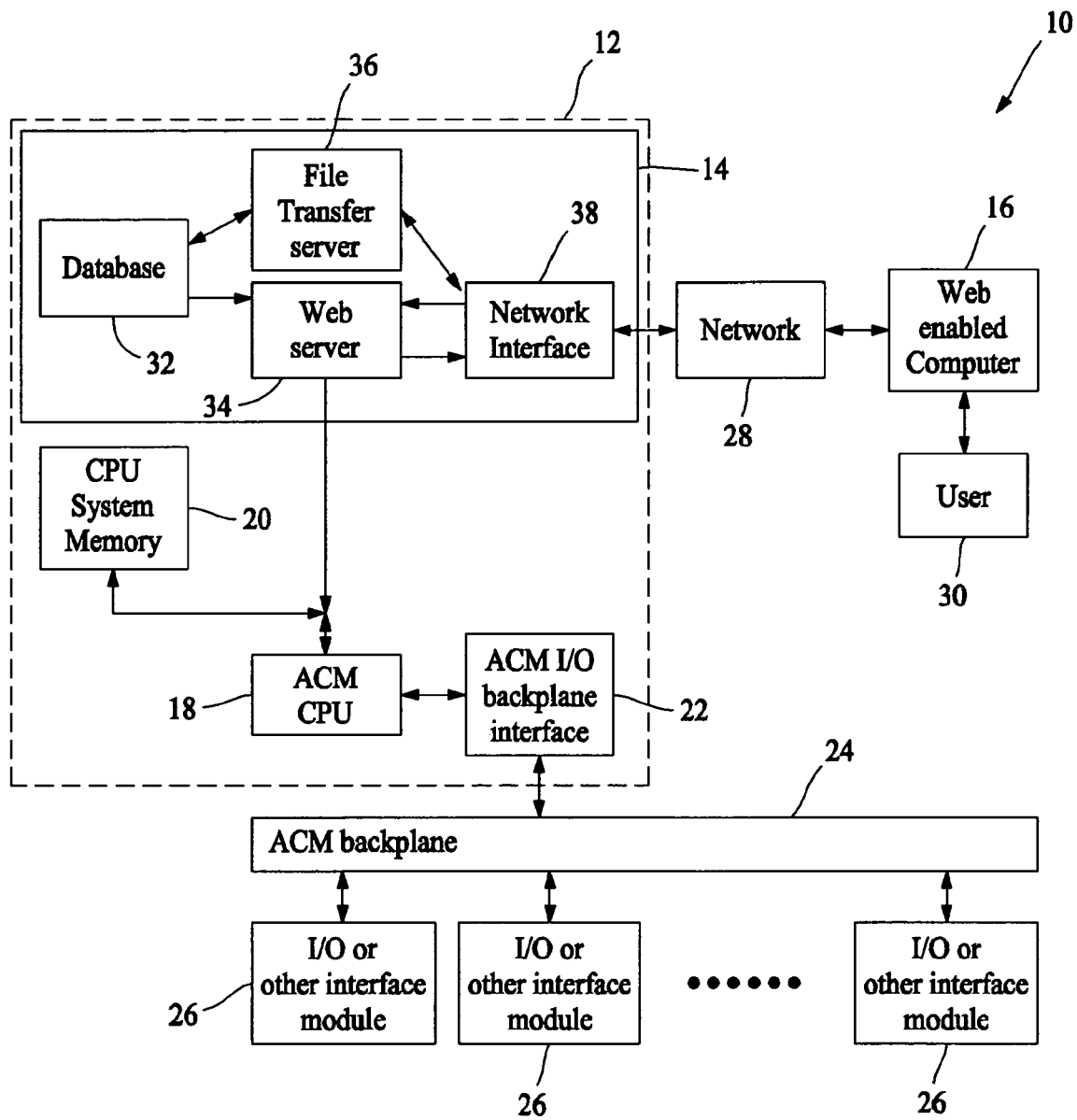
FIG. 1 is a block diagram illustrating one embodiment of an ACM system of the present invention.

FIG. 1 illustrates, in block diagram form, hardware architectures that can be utilized in conjunction with an ACM management and control system. The system can be implemented on many different platforms and utilize many different architectures. The architectures illustrated in FIG. 1 are exemplary only.

FIG. 1 is a block diagram illustrating one embodiment of ACM system 10. System 10 includes an eWeb ACM 12, a web and file transfer subsystem 14, and a web-enabled computer 16. EWeb ACM 12 includes an ACM CPU 18 that carries out ACM functions, for example user logic and function block executions, input/output (I/O) scanning, and communications to other devices. ACM CPU 18 includes a CPU system memory 20 electrically connected to CPU 18 and, in one embodiment, contains both the operating system (not shown)

for ACM CPU 18 and a user's program and data. In one embodiment, an ACM I/O backplane interface 22 is connected to ACM CPU 18, and provides an interface between ACM CPU 18 and an ACM backplane 24 connected to interface 22. ACM backplane 24 provides a physical and electrical means for connecting various I/O or other input modules 26, for example communications or motion modules, into eWeb ACM 12. ACM backplane 24 facilitates the exchange of data between modules 26 and ACM CPU 18. In one embodiment, one or more modules 26 provide an interface for real world inputs (not shown), such as limit or proximity switch status, position of an object, temperature, or pressure, to ACM CPU 18 as parameters for logic or function block execution. In another embodiment, one or more modules 26 provide an interface to real world outputs (not shown) as commanded by ACM CPU 18 to control output devices (not shown), such as actuators, contactors, or solenoids.

Web-enabled computer 16 is electrically connected to a network 28. Network 28 includes the physical medium and intermediate devices (not shown), such as routers, and switches, that connect computer 16 to eWeb ACM 12. In one embodiment, network 28 is a wide area network (WAN), such as the Internet. In an alternative embodiment, network 28 is a local area network (LAN), such as an Intranet. In yet another alternative embodiment, network 28 uses ethernet standard. A user 30 accesses, such as dialing into, or directly logging onto, an Intranet or the Internet to gain access to eWeb ACM 12. In one embodiment, computer 16 includes a web browser, and eWeb ACM 12 is accessible to computer 16 via the Internet. Computer 16 is interconnected to the Internet through many interfaces including a different network (not shown), such as a WAN or a LAN, dial in connections, cable modems and special high-speed ISDN lines. Computer 16 is any device capable of interconnecting to the Internet, including a web-based telephone or other web-based connectable equipment.

Computer 16 displays PLC data on at least one web page (not shown), and retrieves web page files (not shown) stored on a database 32 embedded within web and file transfer subsystem 14. Web page files are text files that may contain hypertext markup language (HTML), Javascript, and/or references to other files, such as image files to be displayed with the web page or Java Applets. In another embodiment, web page files include ACM tag functions that reference ACM data stored in CPU system memory 20. The tag facilitates the exchange of data between ACM CPU 18 and a web server 34 embedded within web and file transfer subsystem 14. Further, the tag provides a generic mechanism for user 30 to display and/or control ACM data with a standard browser. In one embodiment, computer 16 includes web authoring tools and/or text editors that, along with user input, are utilized to create and modify web page files.

User 30 views and/or controls ACM data from computer 16. In one embodiment, user 30 created a web page file. Web and file transfer subsystem 14 is electrically connected to ACM CPU 18, CPU system memory 20, and network 28. Subsystem 14 is shown in FIG. 1 to be embedded within eWeb ACM 12. In an alternative embodiment, subsystem 14 is contained in a separate module connected to backplane 24. Web and file transfer subsystem 14 includes database 32, web server 34, a file transfer server 36, and a network interface 38 that provides the lower level protocols (TCP/IP) and physical hardware connections to network 28. File transfer server 36 is electrically connected to database 32 and network interface 38, and transfers web page files and associated elements between database 32 and computer 16. File transfer server 36 facilitates downloading customizable user defined web pages to eWeb ACM 12 as described below. In one embodiment, file transfer server 36 is a file transfer protocol server.

Web server 34 is electrically connected to database 32, network interface 38, and ACM CPU 18. Web server 34 receives and processes hypertext transfer protocol (HTTP) requests to send web pages to computer 16 and, based upon the requests, sends the requested web page to computer 16. If the requested web page includes a tag function, web server 34 parses and executes the tag function and either embeds ACM data within a web page file thereby displaying the web page on a browser on computer 16, or transmits ACM data to ACM CPU 18. In one embodiment, web server 34 transfers ACM data to ACM CPU 18 to control operation of eWeb ACM 12.

In one embodiment, user 30 must enter a valid user name and valid user password to access eWeb ACM 12 and web and file transfer subsystem 14. The user name and user password correspond to a user profile stored in database 32. User 30 configures the number of web and file transfer TCP connections (not shown) using computer 16. A value of zero allows user 30 to disable the web and file transfer TCP connections.

Figure 2:
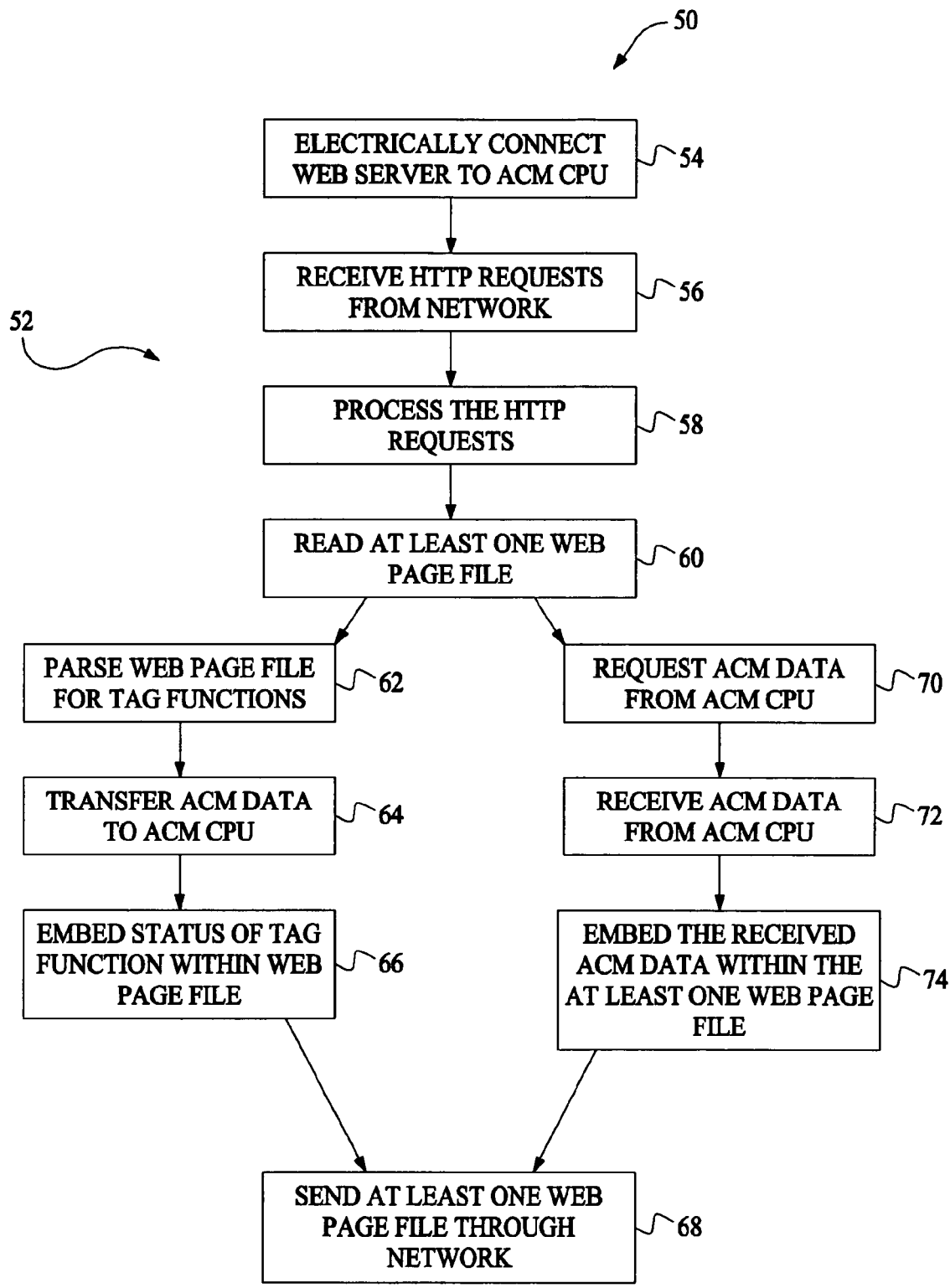
FIG. 2 is a flow chart illustrating one embodiment of a method for management and control of an automation control module using an ACM system.

FIG. 2 is a flow chart 50 illustrating a method 52 for management and control of eWeb ACM 12 (shown in FIG. 1). Method 52 includes electrically connecting 54 web server 34 (shown in FIG. 1) to ACM CPU 18 (shown in FIG. 1). Web server 34 receives 56 HTTP requests from network 28 (shown in FIG. 1) and processes 58 the HTTP requests. In one embodiment, web server 34 processes 58 the HTTP requests, reads 60 at least one web page file (not shown), parses 62 the web page file for tag functions, uses form data from the HTTP request to transfer 64 ACM data to ACM CPU 18 to control operation of eWeb ACM 12, embeds 66 the status of the tag function within the at least one web page file, and sends 68 the at least one web page file through network 28. In another embodiment, web server 34 processes 58 the HTTP requests, reads 60 at least one web page file from database 32, requests 70 ACM data from ACM CPU 18 based on parsing the web page file for tag functions and applying form data from the HTTP request, and receives 72 ACM data from ACM CPU 18. Further, web server 34 embeds 74 the received ACM data within the at least one web page file and sends 68 the at least one web page file through network 28.

Figure 3:
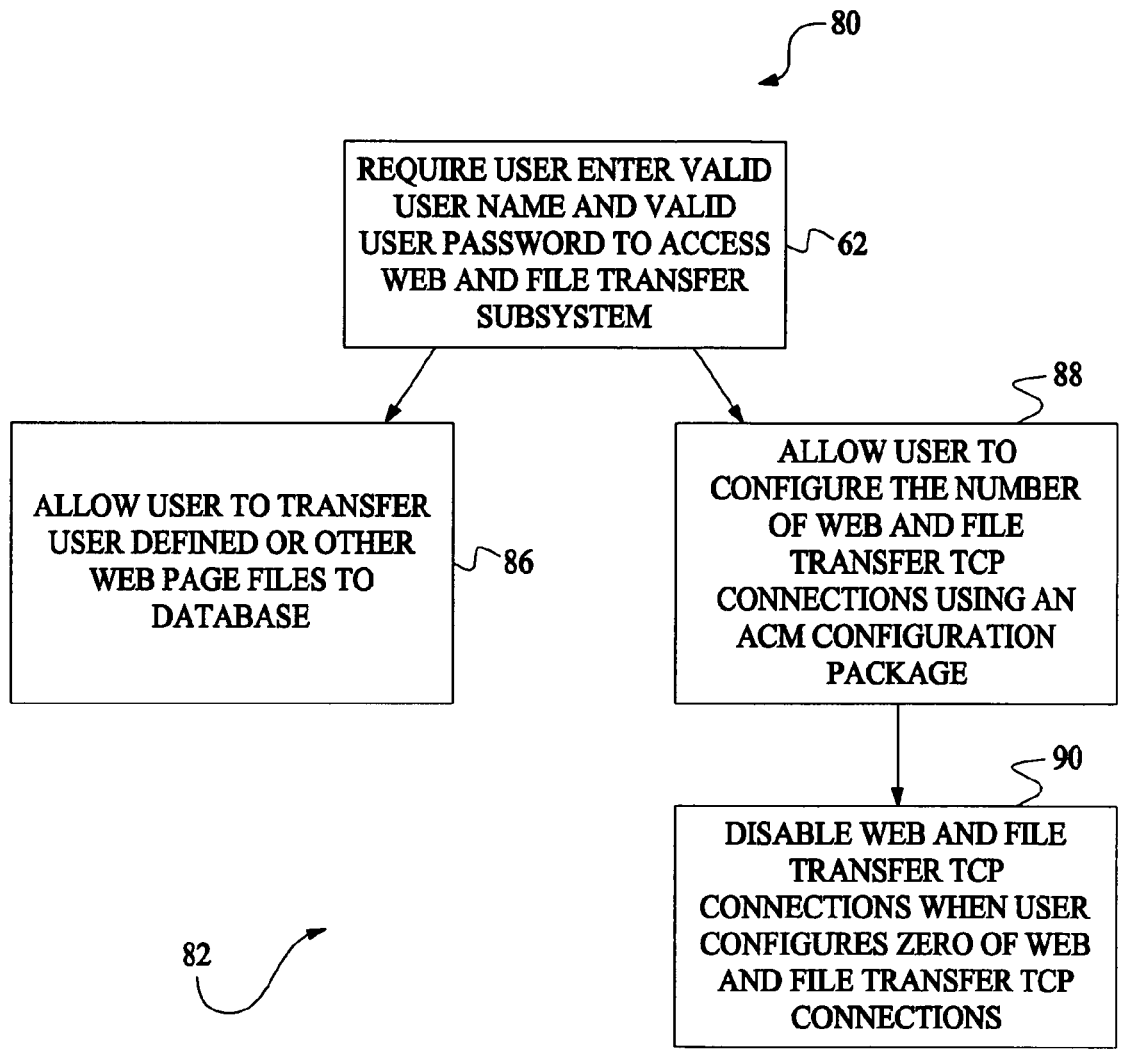
FIG. 3 is a flow chart illustrating another embodiment of a method for management and control of an automation control module using an ACM system.

FIG. 3 is a flow chart 80 illustrating a method 82 for management and control of eWeb ACM 12 (shown in FIG. 1) using ACM system 10 (shown in FIG. 1). Method 82 includes requiring 84 user 30 to input a valid user name and valid user password to access web and file transfer subsystem 14 (shown in FIG. 1) and allowing 86 user 30 to transfer user defined or other web page files to database 32. In another embodiment, method 82 includes allowing 88 user 30 to configure the number of web and file transfer TCP connections (not shown) using an ACM configuration package (not shown). The web and file transfer TCP connections are disabled 90 when user 30 configures zero of the web and file transfer TCP connections.

Figure 4:
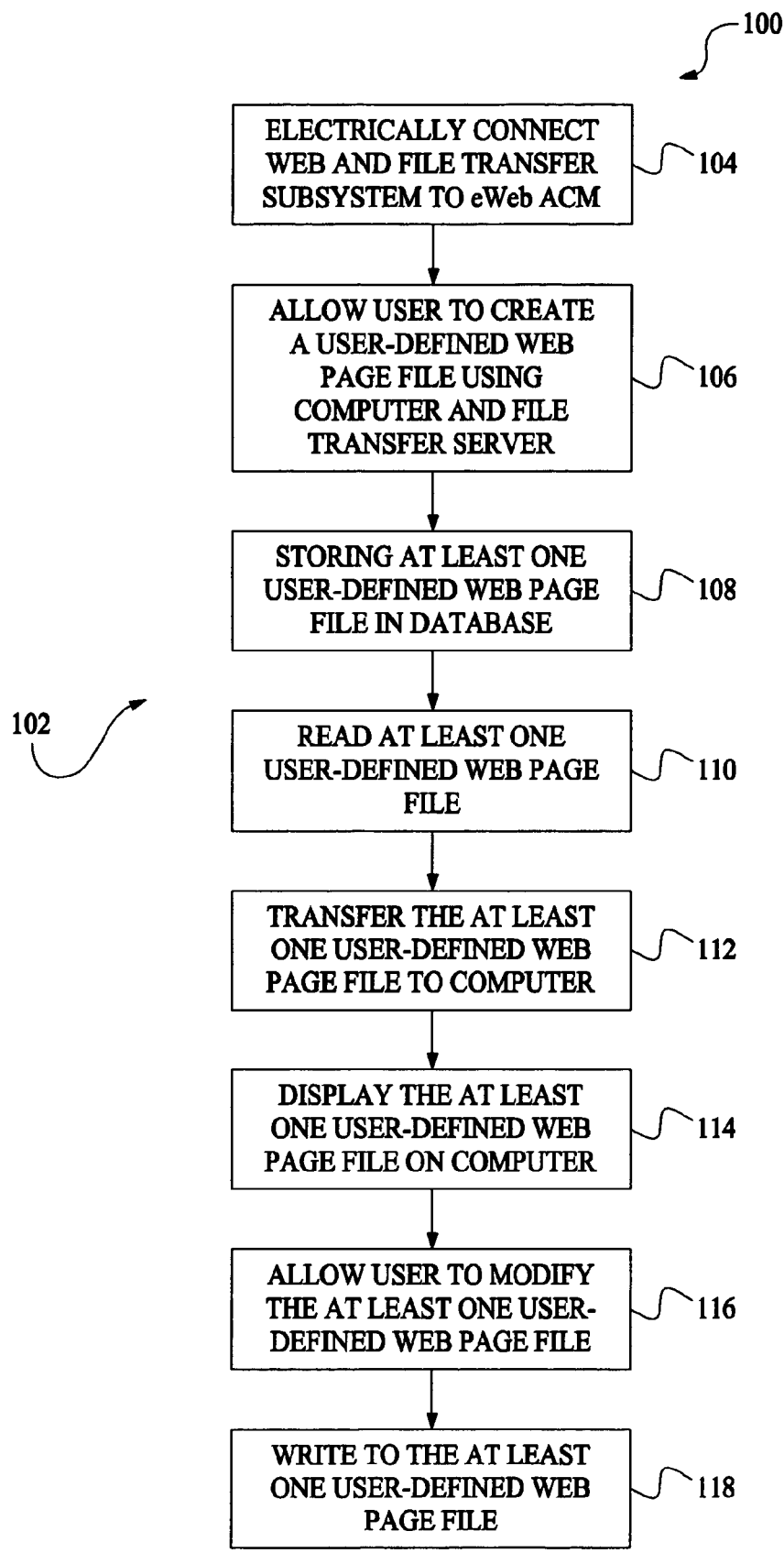
FIG. 4 is a flow chart illustrating another embodiment of a method for management and control of an automation control module using an ACM system.

FIG. 4 is a flow chart 100 illustrating a method 102 for management and control of eWeb ACM 12 (shown in FIG. 1) using ACM system 10 (shown in FIG. 1). Method 102 includes electrically connecting 104 web and file transfer subsystem 14 (shown in FIG. 1) to eWeb ACM 12, allowing 106 user 30 to create a user-defined web page file (not shown) using computer 16 (shown in FIG. 1) and file transfer server 36 (shown in FIG. 1), and storing 108 at least one user-defined web page file in database 32 (shown in FIG. 1). File transfer server 36 reads 110 the at least one user-defined web page file stored in database 32, transfers 112 the at least one user-defined web page file to computer 16, and displays 114 the at least one user-defined web page file on computer 16. Computer 16 and file transfer server 36 allow 116 user 30 to modify the at least one user-defined web page file, and file transfer server 36 writes 118 to the at least one user-defined web page file.

Figure 5:
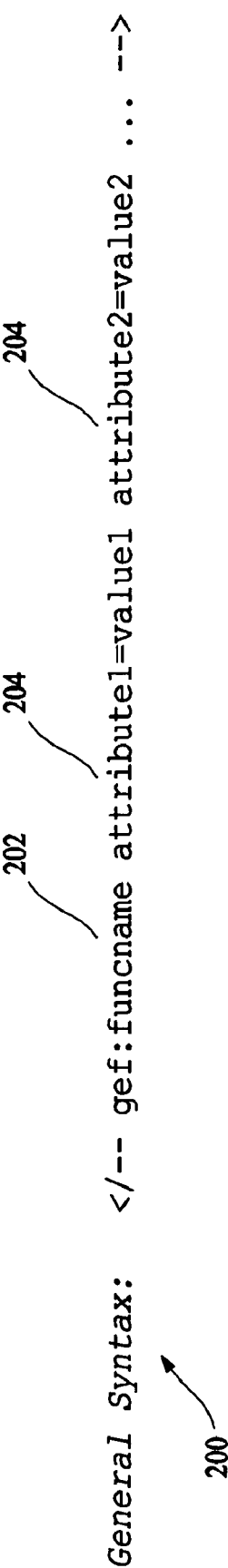
FIG. 5 is an example of an ACM HTML tag comment.

FIG. 5 is an example of an ACM HTML tag comment syntax 200 that includes a specified defined function 202. Tag comment 200 also includes a plurality of attributes 204, which may be function-specific parameters or general attributes, such as data display requirements.

Figure 6:
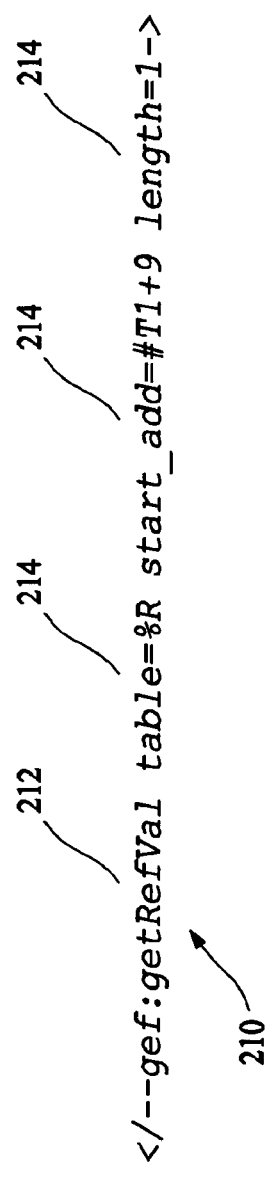
FIG. 6 is another example of an ACM HTML tag comment.

FIG. 6 is another example of an ACM HTML tag comment 210 that includes a specified defined function 212. Tag comment 210 also includes a plurality of attributes 214.

Figure 7:
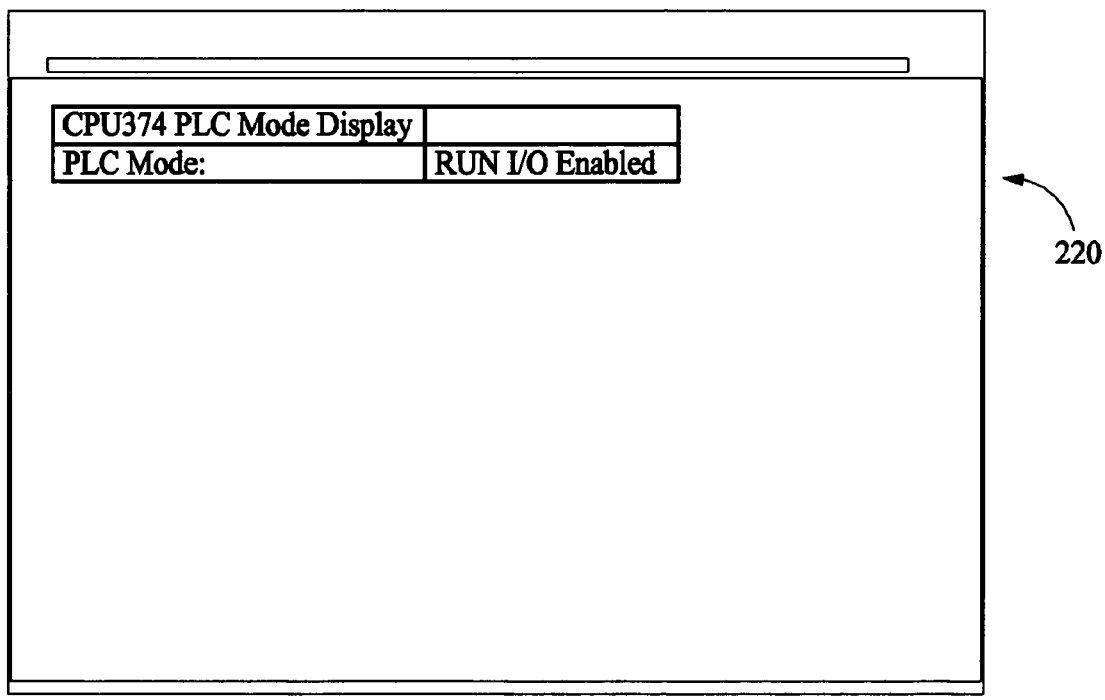
FIG. 7 is an example of an HTML web page for retrieving a mode of the ACM of the present invention using HTML and ACM tag functions.

FIG. 7 is an example of a web page 220 for retrieving a mode of eWeb ACM 12 using HTML and ACM tag functions.

Figure 8:
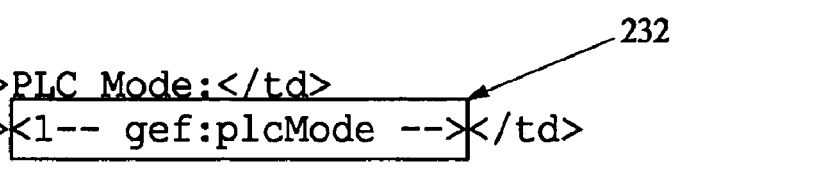
FIG. 8 is an HTML for the web page illustrated in FIG. 6.

FIG. 8 is an HTML 230 for web page 220. HTML 230 includes an ACM tag function 232 that causes web server 34 to retrieve the ACM mode from eWeb ACM 12.

Figure 9:
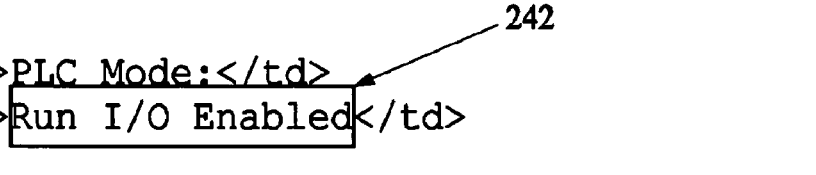
FIG. 9 is an HTML for a web page that displays the ACM mode requested in the HTML illustrated in FIG. 7.

FIG. 9 is an example of an HTML 240 for a web page that displays the ACM mode requested in HTML 230. HTML 240 includes a return string value 242 from tag function 232. HTML 240 does not include the ACM tag information.

FIG. 10 is an example of an HTML 250 for a web page for retrieving a mode of eWeb ACM 12 using HTML, Javascript, and ACM tag functions. HTML 250 includes an ACM tag function 252 that causes web server 34 to retrieve the mode of eWeb ACM 12.

ACM system 10 provides reduced system hardware costs, rapid development of custom ACM monitoring and control tools that reduce implementation costs, and fast response time accessing ACM data with low impact on other critical real-time ACM functions such as ACM sweep time, thereby reducing production costs. In addition, ACM system 10 facilitates rapid access to ACM data on standard devices such as a web browser on computer 16 or PDA via a standard network.

Figure 11:
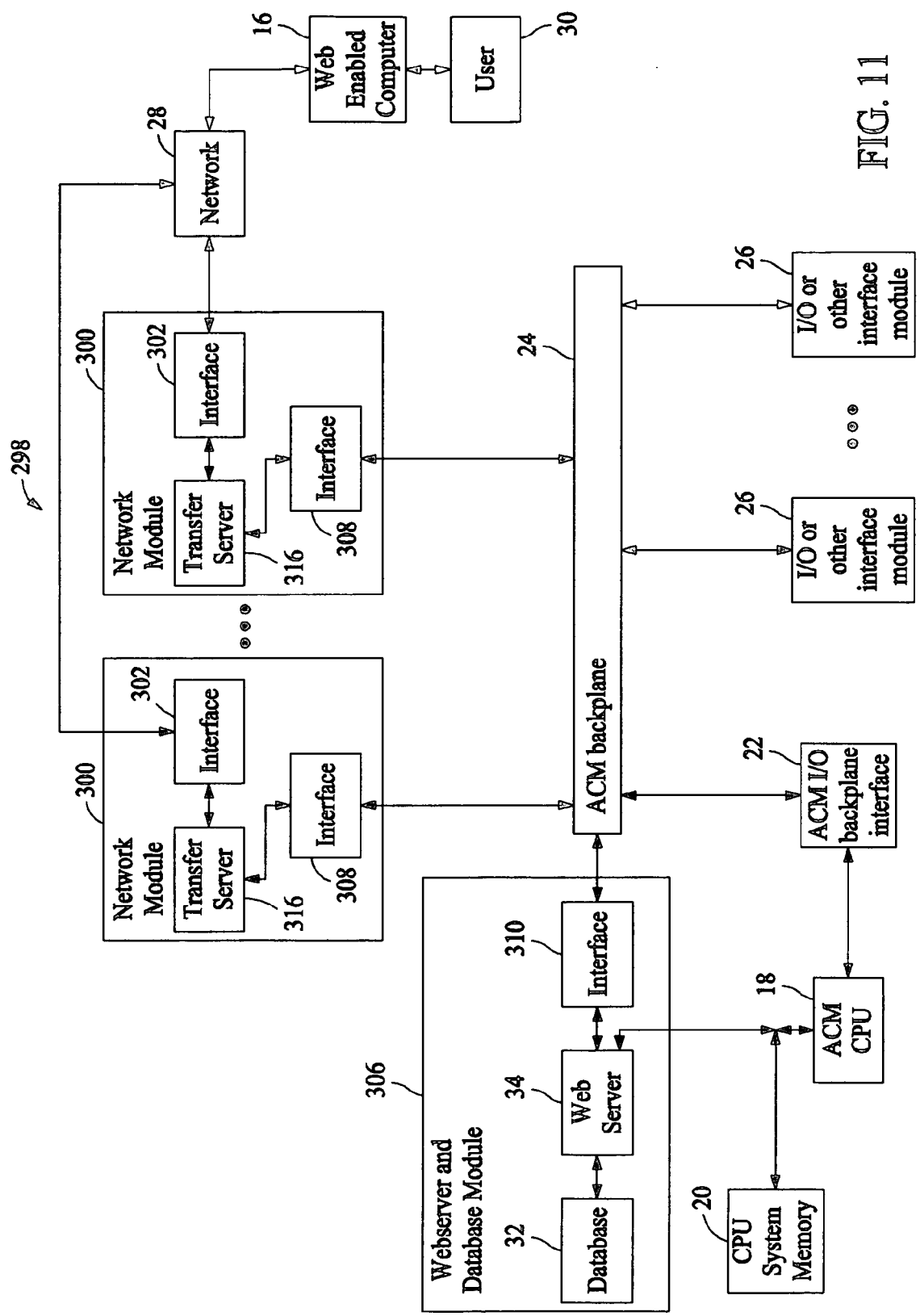
FIG. 11 is a block diagram of an embodiment of an ACM system.

FIG. 11 shows an embodiment of an ACM system 298. ACM system 298 includes web-enabled computer 16, ACM CPU 18, CPU system memory 20, ACM I/O backplane interface 22, ACM backplane 24, modules 26, network 28, at least one network module 300, and a web server and database module 306. Web server and database module 306 includes database 32 that is connected to web server 34 that is further connected to interface 310. Interface 310 provides an interface between web server 34 and ACM backplane 24. Network module 300 includes a transfer server 316 that is connected to interface 302 and to interface 308. Interface 302 of network module 300 is connected to web-enabled computer 16 via network 28 and provides an interface between network 28 and transfer server 316. Interface 308 provides an interface between ACM backplane 24 and transfer server 316. ACM I/O backplane interface 22 is connected to ACM CPU 18 that is connected to CPU system memory 20. ACM I/O backplane interface 22 is also connected via ACM backplane 24 to I/O module 26. ACM I/O backplane interface 22 provides an interface between ACM CPU 18 and ACM backplane 24. CPU system memory 20 is connected to web server 34. In an alternative embodiment, web server and database module 306 is located inside ACM CPU 18.

In use, user 30 sends a request, for example, a request for a file, via network 28 and interface 302 to transfer server 316 of network module 300. Examples of files include web page files, document files, e-mail files, files that include audio information, such as audio clips, files that include video information, such as video clips, and files that include images. Examples of images include jpeg images, tiff images, and pdf images. Transfer server 316 receives the request, packs the request in a message, and transmits the message to web server 34 via interface 308, ACM backplane 24, and interface 310. Transfer server 316 waits for web server 34 to respond to the message. Web server 34 retrieves the file that is requested from database 32 and transmits the file to transfer server 316 via interface 310, ACM backplane 24, and interface 308. Transfer server 316 transmits the file to web-enabled computer 16 via interface 302 and network 28. Before transmitting the file to web-enable computer 16, ACM data can be embedded within the file by the methods described above.

ACM system 298 allows multiple network modules 300 to access the same web server 34. Moreover, ACM system 298 eliminates the need to have multiple copies of the same web page by having one database 32 in which the web page is stored. ACM system 298 reduces hardware requirements, such a web server (not shown) located within each network module 300, by locating the web page in web server and database module 306 instead of locating multiple copies of the web page in network modules 300. ACM system 298 reduces cycle times for retrieving multiple copies of the web page since the web page is built by web server 34 and sent to network modules 300 rather than building multiple copies of the web page using a web server located within each of network modules 300.

Figure 12:
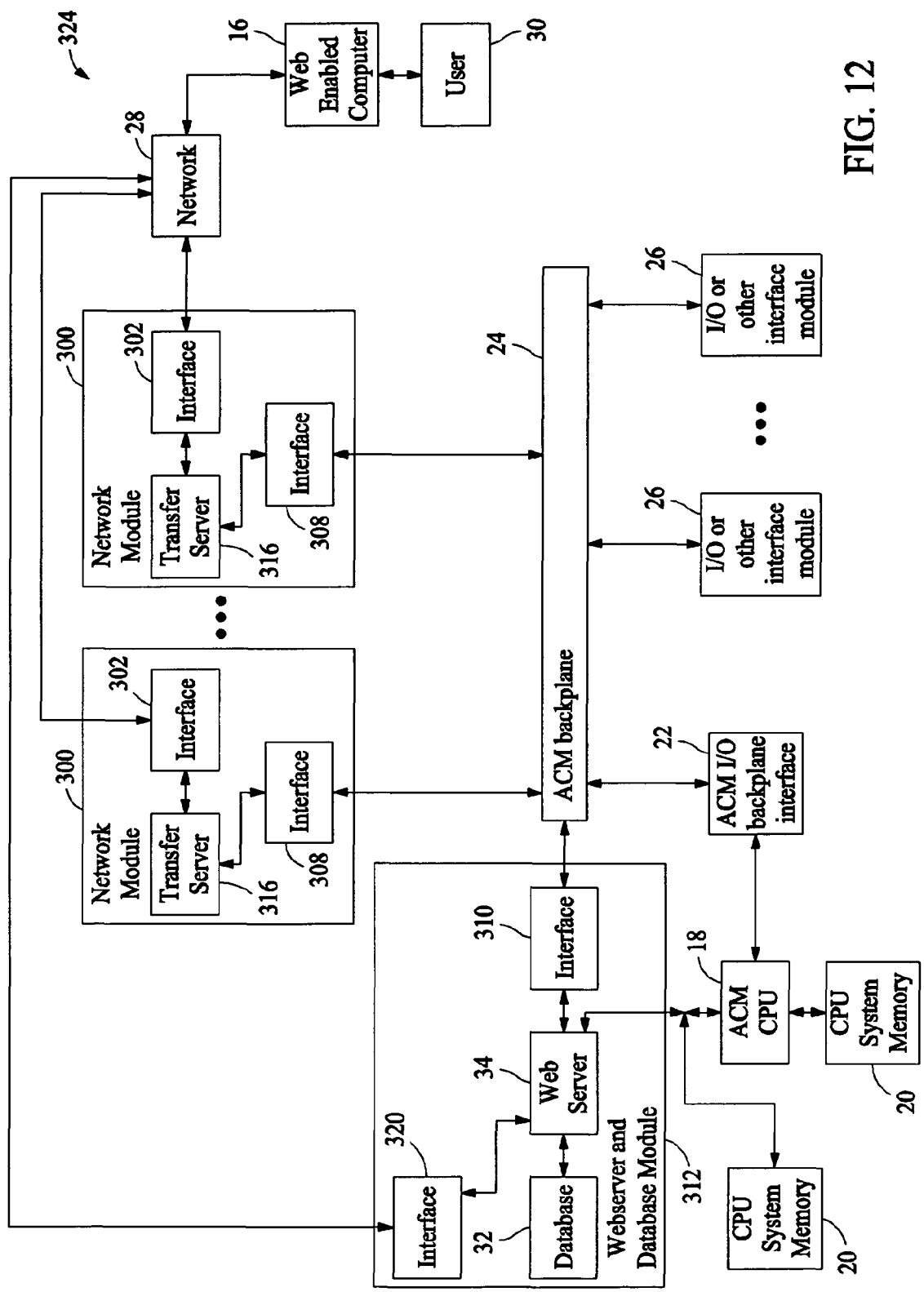
FIG. 12 is a block diagram of another embodiment of an ACM system.

FIG. 12 shows another embodiment of an ACM system 324. ACM system 324 includes web-enabled computer 16, ACM CPU 18, CPU system memory 20, ACM I/O backplane interface 22, ACM backplane 24, modules 26, network 28, at least one network module 300, and a web server and database module 322. Web server and database module 322 includes database 32 that is connected to web server 34 that is further connected to interface 310. Web server 34 is also connected to an interface 320. Interface 310 provides an interface between web server 34 and ACM backplane 24. Interface 320 provides an interface between web server 34 and network 28. Network module 300 includes transfer server 316 that is connected to interface 302 and to interface 308. Interface 302 of network module 300 is connected to web-enabled computer 16 via network 28 and provides an interface between network 28 and transfer server 316. Interface 308 provides an interface between ACM backplane 24 and transfer server 316. ACM I/O backplane interface 22 is connected to ACM CPU 18 that is connected to CPU system memory 20. ACM I/O backplane interface 22 is also connected via ACM backplane 24 to modules 26. ACM I/O backplane interface 22 provides an interface between ACM CPU 18 and ACM backplane 24. CPU system memory 20 is connected to web server 34. In an alternative embodiment, web server and database module 322 is located inside ACM CPU 18.

In use, user 30 sends a request, for example, a request for a file, via network 28 and interface 302 to transfer server 316 of network module 300. Transfer server 316 receives the request, routes the request to web server 34 via interface 302, network 28, and interface 320. Alternatively, transfer server 316 receives the request, routes the request to web server 34 via interface 308, ACM backplane 24, and interface 310. Web server 34 retrieves the file that is requested from database 32 and transmits the file to transfer server 316 via interface 320, network 28, and interface 302. Alternatively, web server 34 retrieves the file that is requested from database 32 and transmits the file to transfer server 316 via interface 310, ACM backplane 24, and interface 308. Transfer server 316 receives the file from web server 34 and transmits the file to web-enabled computer 16 via interface 302 and network 28. Before transmitting the file to web-enabled computer 16, ACM data can be embedded within the file by the methods described above. It is to be noted that if web server 34 receives the request via interface 310 and sends the file via interface 310, web server 34 does not include interface 320.

ACM system 324 allows multiple network modules 300 to access the same web server 34. Moreover, ACM system 324 eliminates the need to have multiple copies of the same web page by having one database 32 in which the web page is stored. ACM system 324 reduces hardware requirements, such a web server (not shown) located within each network module 300, by locating the web page in web server and database module 322 instead of locating a copy of the web page in each network module 300. ACM system 324 reduces cycle times for retrieving multiple copies of the web page since the web page is built by web server 34 and sent to network modules 300 rather than building multiple copies of the web page using a web server located within each of network modules 300.

Figure 13:
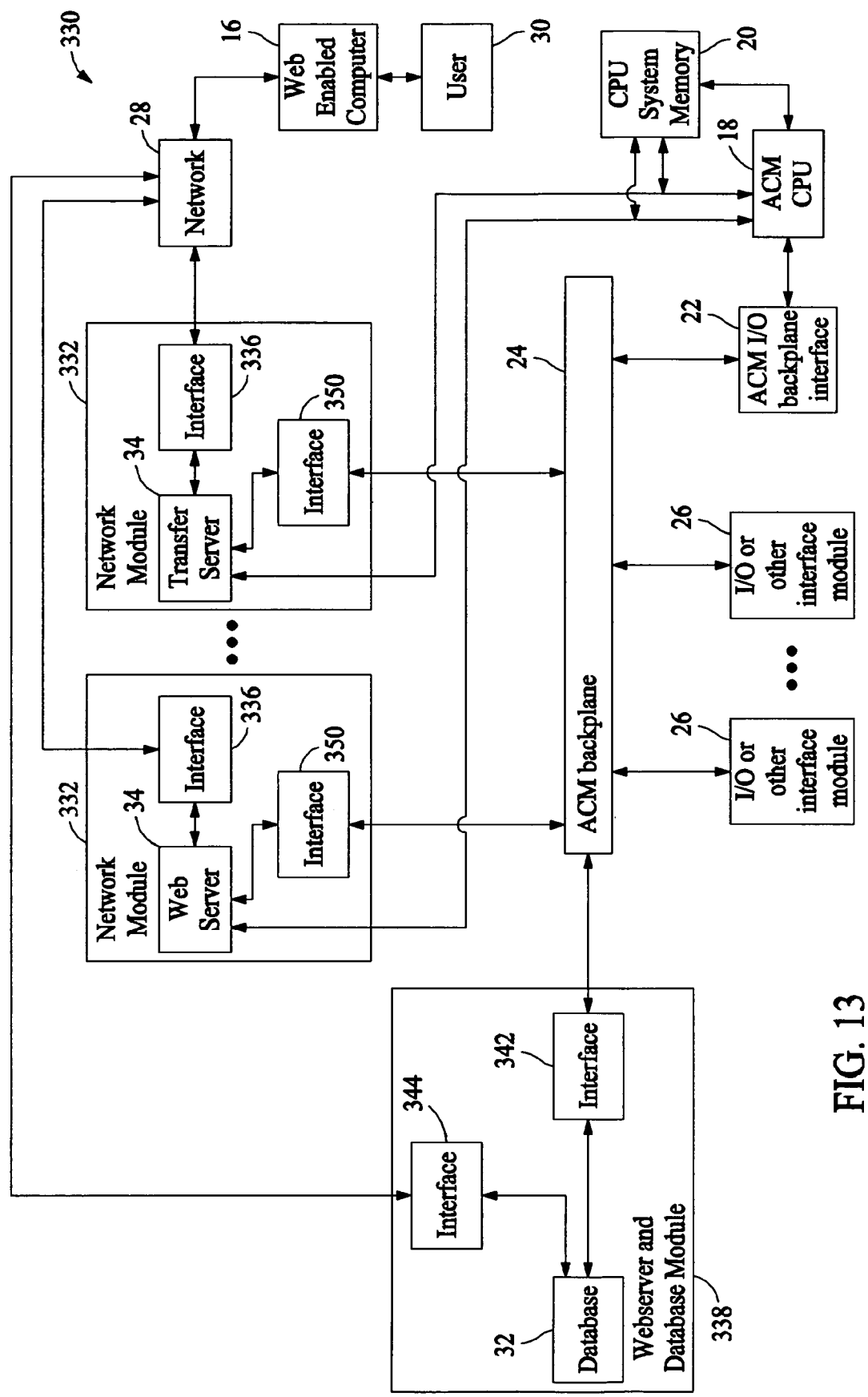
FIG. 13 is a block diagram of yet another embodiment of an ACM system.

FIG. 13 shows another embodiment of an ACM system 330. ACM system 330 includes web-enabled computer 16, ACM CPU 18, CPU system memory 20, ACM I/O backplane interface 22, ACM backplane 24, modules 26, network 28, at least one network module 332, and a web server and database module 338. Web server and database module 338 includes database 32 connected to an interface 342 and to an interface 344. Interface 342 provides an interface between database 32 and ACM backplane 24. Interface 344 provides an interface between database 32 and network 28. Network module 332 includes web server 34 that is connected to an interface 336 and to an interface 350. Interface 336 of network module 332 is connected to web-enabled computer 16 via network 28 and provides an interface between network 28 and web server 34. Interface 350 provides an interface between ACM backplane 24 and web server 34. ACM I/O backplane interface 22 is connected to ACM CPU 18 that is connected to CPU system memory 20. ACM I/O backplane interface 22 is also connected via ACM backplane 24 to modules 26. ACM I/O backplane interface 22 provides an interface between ACM CPU 18 and ACM backplane 24. CPU system memory 20 is connected to web server 34 of network module 332. In an alternative embodiment, web server and database module 338 is located inside ACM CPU 18.

In use, user 30 sends a request, for example, a request for a file, via network 28 and interface 336 to web server 34 of network module 332. Web server 34 receives the request and retrieves the file requested from database 32 via interface 336, network 28 and interface 344. Alternatively, web server 34 receives the request and retrieves the file requested from database 32 via interface 350, ACM backplane 24, and interface 342. Web server 34 receives the file from database 32 and transmits the file to web-enabled computer 16 via interface 336 and network 28. Before transmitting the file to web-enable computer 16, ACM data can be embedded within the file by the methods described above. It is to be noted that if web server 34 receives the request via interface 342, ACM backplane 24, and interface 350, web server and database module 338 does not include interface 344.

ACM system 330 eliminates the need to have multiple copies of the same web page by having one database 32 in which the web page is stored. ACM system 330 reduces hardware requirements, such as a database (not shown) located within each network module 334, by locating the web page in database 32 of web server and database module 338 instead of locating a copy of the web page in a database of each of network modules 332.

While the invention has been described in terms of various specific embodiments, those skilled in the art will recognize that the invention can be practiced with modification within the spirit and scope of the claims.

What is claimed is:

1. A web-enabled automation control module (ACM) system comprising:
    a computer configured to send a request for a file;
    a first network module and a second network module located outside of said computer and outside a web server and database module, said first network module and said second network module configured to receive the request from said computer via a network;
    an ACM backplane for transferring the request from said first network module and said second network module;
    a database located within said web server and database module configured to store the file;
    said web server located within said web server and database module configured to:
    receive the request for the file from said first network module via said ACM backplane;
    parse the file for tag functions used to request specific ACM data; and
    send the requested file to said first network module, said first network module further configured sends the requested file to a user requesting the file;
    a transfer server located within said network module; and
    an ACM central processing unit (CPU) configured to send the requested ACM data to said web server and database module, wherein said web server is further configured to embed the ACM data in the file to facilitate transferring the ACM data to said network module in response to the request, said ACM CPU coupled directly to said web server and database module.

2. An ACM system in accordance with claim 1 wherein said web server is configured to:
    obtain the file from said database to respond to the request.

3. An ACM system in accordance with claim 2 wherein said transfer server is configured to:
    receive the request from said computer via the network;
    send the request to said web server and database module;
    receive the file from said web server and database module; and
    send the file to said computer via the network.

4. An ACM system in accordance with claim 2 wherein said web server and database module is electrically connected to said network module via said ACM backplane and via the network.

5. An ACM system in accordance with claim 2 wherein said web server and database module is coupled to said ACM CPU that is electrically coupled to said ACM backplane via an interface.

6. An ACM system in accordance with claim 1 wherein said first network module comprises:
    a second web server that is configured to:
    obtain the file from said database; and
    transmit the file to the network; and
    a network interface electrically connected to said second web server and the network.

7. An ACM system in accordance with claim 1 wherein said web server and database module is coupled to said ACM CPU that is electrically coupled to said ACM backplane via an interface.

8. An ACM system in accordance with claim 1 wherein the network is an Ethernet network.

9. A method for managing and controlling an automation control module (ACM) system, said method comprising:
    sending a request for a file from a computer through a network to a first network module and a second network module located outside of the computer and outside a web server and database module;

sending the request from the first network module and the second network module via an ACM backplane to a web server located within the web server and database module;

receiving, by the web server, the request via the ACM backplane;

storing the file in a database of the web server and database module;

requesting, by the web server, ACM data from an ACM central processing unit (CPU) that is coupled directly to the web server and database module based on tag functions embedded in the file;

sending the requested ACM data from the ACM CPU to the web server and database module, wherein the ACM CPU is coupled directly to the web server and database module;

retrieving the file from the database via the web server;

embedding the ACM data in the file to facilitate transferring the ACM data to the first network module in response to the request; and transmitting the file from the web server to the computer via the first network module and the network.

10. A method in accordance with claim 9 further comprising:

sending the request from the network to a transfer server of the first network module;

sending the request from the transfer server to the web server and database module; and waiting to receive the file from the web server and database module.

11. A method in accordance with claim 9 wherein sending the request from the first network module to the web server of the web server and database module comprises sending the request from the first network module to the web server of the web server and database module via the network.

12. A method in accordance with claim 9 wherein sending the request from the first network module to the web server of the web server and database module comprises sending the request from the network module to the web server and database module located within the ACM CPU.

13. A method in accordance with claim 9 wherein storing the file in the database of the web server and database module comprises storing the file in the database of the web server and database module located within the ACM CPU.

14. An ACM system in accordance with claim 1 wherein sending the request for the file from the network to the first network module comprises sending the request for the file from an Ethernet network to the first network module.

15. A method for managing and controlling an automation control module (ACM) system, the ACM system including a first network module and a second network module located outside of a computer, the first network module and the second network module being electrically connected to a network, the ACM system also including a web server and database module electrically connected to the first network module and the second network module, the web server and database module being located outside the first network module and the second network module, the web server and database module including a web processing component, the method comprising:

receiving a request for a file from the computer through the network by the first network module and the second network module located outside of the computer and outside the web server and database module;

receiving, by the web processing component, the request via an ACM backplane;

storing the file in a database of the web server and database module;

parsing the file for tag functions used to determine desired ACM data to be returned to the computer;

transmitting the desired ACM data to be embedded in the file from an ACM central processing unit (CPU) to facilitate transferring the ACM data to the computer via the first network module in response to the request, wherein the ACM CPU is coupled directly to the web server and database module;

retrieving the file requested from the database of the web server and database module;

transmitting the file requested from the web processing component to the first network module; and sending the file requested via the network from the first network module to a user requesting the file.

16. A method in accordance with claim 15 further comprising:

sending the request from the first network module to the web processing component of the web server and database module;

obtaining the file from the database to respond to the request; and sending the file from the web processing component to the first network module.

17. A method in accordance with claim 16 wherein sending the request from the first network module to the web processing component of the web server and database module comprises sending the request from the first network module to the web server of the web server and database module via the network.

18. A method in accordance with claim 16 wherein sending the request from the first network module to the web processing component of the web server and database module comprises sending the request from the network module to the web server and database module located within the ACM CPU.

19. A method for managing and controlling network traffic comprising utilizing at least one network module and a web server and database module that includes a web processing component and a database, the web server and database module located outside the at least one network module, said method comprising:

receiving, by a first network module and a second network module located outside of a computer and outside the web server and database module, a message from the computer via a network;

transferring the message from the first network module and the second network module via an automation control module (ACM) backplane to the web processing component to facilitate transferring the message to the first network module in response to a request, wherein the message is transferred from an ACM central processing unit (CPU) that is coupled directly to the web server and database module;

receiving, by the web processing component, the message via the ACM backplane;

storing a file requested in the message in the database of the web server and database module;

parsing the file to determine a set of requested ACM data based on tag functions within the file;

embedding the requested ACM data in the message in response to execution of the tag functions;

retrieving the file requested in the message from the database of the web server and database module;

transmitting the file requested from the web processing component to the first network module; and sending the file requested via the network from the first network module to a user requesting the file.

20. A method in accordance with claim 19 wherein retrieving the file comprises retrieving at least one of a web page file, a document file, an e-mail file, an image file, an audio file, and a video file.

21. A method in accordance with claim 19 wherein receiving the message comprises receiving, by the network module, the message via an Ethernet network.

* * * * *